(12) United States Patent
Matson

(10) Patent No.: US 9,939,542 B2
(45) Date of Patent: Apr. 10, 2018

(54) SIGNAL ENHANCEMENT USING DIVERSITY SHOT STACKING FOR REVERSE TIME MIGRATIONS (DESSERT)

(71) Applicant: SHELL OIL COMPANY, Houston, TX (US)

(72) Inventor: Kenneth Howell Matson, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 686 days.

(21) Appl. No.: 14/383,336

(22) PCT Filed: Mar. 7, 2013

(86) PCT No.: PCT/US2013/029649
§ 371 (c)(1),
(2) Date: Sep. 5, 2014

(87) PCT Pub. No.: WO2013/134524
PCT Pub. Date: Sep. 12, 2013

(65) Prior Publication Data
US 2015/0030210 A1    Jan. 29, 2015

Related U.S. Application Data

(60) Provisional application No. 61/608,928, filed on Mar. 9, 2012.

(51) Int. Cl.
*G06F 19/00*    (2011.01)
*G01V 1/34*    (2006.01)
(Continued)

(52) U.S. Cl.
CPC .............. *G01V 1/34* (2013.01); *G01V 1/362* (2013.01); *G06T 5/002* (2013.01);
(Continued)

(58) Field of Classification Search
CPC .... G01V 1/34; G01V 1/362; G01V 2210/324; G01V 2210/514
(Continued)

(56) References Cited

U.S. PATENT DOCUMENTS 3,622,967 A    11/1971    Foster et al.
4,887,243 A    12/1989    Pann
(Continued)

FOREIGN PATENT DOCUMENTS

CN    1278923 A    1/2001
CN    1797031 A    7/2006
(Continued)

OTHER PUBLICATIONS

PCT International Search Report, Application No. PCT/US2013/029649 dated May 9, 2013.
Qing Xu, Yunfeng Li, Xiangkun Yu, Yan Huang, 2011, Reverse Time Migration Using Vector Offset Output to Improve Subsalt Imaging—A Case Study at the Walker Ridge GOM, SEG Annual Meeting.
(Continued)

*Primary Examiner* — Edward Raymond

(57) ABSTRACT

A method of processing seismic data so as to provide an image of a subsurface region, comprises providing plurality of migrated shot gathers that contain information about the region, summing portions of the migrated shot gathers to provide a pilot stack, partitioning the plurality of gathers into a plurality of groups and summing the gathers in each group to provide a substack, wherein each group includes at least two migrated shots and wherein a substack is generated from each group, applying an amplitude normalization algorithm to the pilot stack so as to generate an amplitude-normalized pilot stack, calculating a weight function by comparing each substack to the normalized pilot stack, weighting each substack using the weight function so as to generate a plurality of weighted substacks, summing overlapping portions of the weighted substacks so as to generate a output stack, and using the output stack to generate an image.

14 Claims, 3 Drawing Sheets

(51) Int. Cl.
*G01V 1/36* (2006.01)
*G06T 5/00* (2006.01)

(52) U.S. Cl.
CPC .. *G01V 2210/324* (2013.01); *G01V 2210/514* (2013.01); *G01V 2210/74* (2013.01); *G06T 2207/30184* (2013.01)

(58) Field of Classification Search
USPC .................................. 702/14, 182–185, 188
See application file for complete search history.

(56) References Cited

U.S. PATENT DOCUMENTS

| 5,136,550 | A | 8/1992 | Chambers | |
|---|---|---|---|---|
| 7,222,023 | B2 | 5/2007 | Laurent et al. | |
| 7,505,360 | B2 | 3/2009 | Bisley et al. | |
| 2006/0077757 | A1* | 4/2006 | Cox | G01V 1/40 367/25 |
| 2006/0265132 | A1 | 11/2006 | Rickett | |
| 2008/0304359 | A1 | 12/2008 | Ferber | |
| 2009/0279388 | A1 | 11/2009 | Monk et al. | |
| 2010/0057367 | A1 | 3/2010 | Kristiansen et al. | |

FOREIGN PATENT DOCUMENTS

| CN | 101609163 A | 12/2009 |
|---|---|---|
| WO | 2006036336 A1 | 4/2006 |

OTHER PUBLICATIONS

Christian Höcker and Gijs Fehmers Fast structural interpretation with structure-oriented filtering The Leading Edge, Mar. 2002, v. 21, p. 238-243.
de Bruin, C. G. M., Wapenaar, C. P. A., and Berkhout, A. J., 1990, Angle-dependent reflectivity by means of prestack migration: Geophysics, 55, 1223-1234. Mosher, C., and Foster, D., 2000, Common angle imaging conditions for prestack depth migration in 70th Ann. Internat. Mtg. Soc. of Expl. Geophys., 830-833.
Prucha, M., Biondi, B., and Symes, W., 1999, Angle-domain common image gathers by wave-equation migration in 69th Ann. Internat. Mtg. Soc. of Expl. Geophys., 824-827.
Rickett, J. E., and Sava, P. C., 2002, Offset and angle-domain common image-point gathers for shot-profile migration: Geophysics, 67, 883-889.
Sava, P. C., and Fomel, S., 2003, Angle-domain common-image gathers by wavefield continuation methods: Geophysics, 68, 1065-1074.
Soubaras, R., 1994, Signal-preserving random noise attenuation by the F-X projection: 64th Annual Internat. Mtg., Soc. Expl. Geophys., Expanded Abstracts, 1576-1579.
Soubaras, R., 2003, Angle gathers for shot-record migration by local harmonic decomposition in 73rd Ann. Internat. Mtg. Soc. of Expl. Geophys., 889-892.
Xie, X. B. and Wu, R. S. 2002, Extracting angle domain information from migrated wavefield in 72nd Ann. Internat. Mtg, Soc. Expl. Geophys., Expanded Abstracts. Soc. of Expl. Geophys., 1360-1363.

* cited by examiner

SIGNAL ENHANCEMENT USING DIVERSITY SHOT STACKING FOR REVERSE TIME MIGRATIONS (DESSERT)

PRIORITY CLAIM

The present application is a National Stage (§ 371) application of PCT/US2013/029012, filed Mar. 7, 2013, which claims the benefit of U.S. Provisional Application No. 61/608,928, filed Mar. 9, 2012, both of which are incorporated herein by reference.

TECHNICAL FIELD OF THE INVENTION

The present invention relates to seismic processing and provides a simple and effective method for enhancing signal on Reverse Time Migration stacks. The method is based on optimal weighting of post-migration substacks of selected shot data.

BACKGROUND OF THE INVENTION

Acoustic techniques are commonly used for imaging the subsurface in the context of hydrocarbon exploration and production. In a common approach, seismic signals are transmitted into the subsurface by sources at the earth's surface or in a borehole. Seismic receivers detect and record the resulting acoustic signals. The received signals, and particularly those that have been reflected and/or refracted in the subsurface, will contain information about the subsurface. Thus, for example, wave equation migration methods such as Reverse Time Migration (RTM) have been critical to imaging beneath complex overburdens such as salt. Despite theoretical and algorithmic improvements, proper post-processing of the migrated image is often a key step in producing optimum imaging quality.

An example of such post-processing is muting of far offset arrivals on image domain gathers where a proper muting can make or break the quality of the final image. In the case of Kirchhoff migration, this is easily and naturally done on post-migration midpoint-offset gathers. Muting is equally important for Wave Equation migration; however, generating appropriate image gathers for this process is a more costly proposition than simply migration output to stack.

Muting or angle weighting of post-RTM data is most correctly performed in the subsurface angle gather domain. Various authors describe methods for computing angle gathers for wave equation migration (de Bruin et al., 1990; Prucha et al., 1999; Mosher and Foster, 2000; Rickett and Sava, 2002; Xie and Wu, 2002; Sava and Fomel, 2003; Soubaras, 2003), but the main impediment is the cost of computing and storing large amounts of output data for full azimuth subsurface angle gathers.

Shot to Image Gathers (SIGs) are a much cheaper alternative to wave equation angle gathers. They are formed by collecting the output from all the individually migrated shots from shot record wave equation migration e.g., Reverse Time Migration. Normally the output images from each shot are stacked together. As illustrated in FIG. 1, Each SIG is formed by collecting the traces at a common output image location and then assigning a vector distance (vector offset) based on the horizontal distance from the image point to the shot location. The result is an SIG such as is shown in FIG. 2. These gathers provide a space where muting can be applied according to this distance.

One complication is that SIG gathers have a dip component that shifts the center of energy away from the zero 'offset,' which makes muting more difficult than with conventional image gathers. A data-dependent mute function would address this issue, but a useful data-dependent mute function can be difficult to compute in areas with poor signal to noise or where the illumination is variable.

Hence, it remains desirable to provide a simple and inexpensive method for deriving and applying optimal weighting coefficients for RTM shot-image gathers so as to improve the overall S/N ratio of the final stack.

SUMMARY OF THE INVENTION

The present invention provides a simple, inexpensive and robust methodology to derive and apply optimal weighting coefficients for RTM shot-image gathers to improve the overall S/N ratio of the final stack. Because the present methods relate to signal enhancement using diversity shot stacking for reverse time migration, they may sometimes hereinafter be referred to by the acronym DeSSeRT. In some embodiments, the weighting is computed by least squares match filtering of individual substacks to the full stacked product.

In preferred embodiments of the invention, a method for processing seismic data comprises the steps of: a) providing plurality of migrated shot gathers that contain information about the subsurface region, b) summing the overlapping portions of the migrated shot gathers to provide a pilot stack, c) partitioning the plurality of migrated shot gathers into a plurality of groups, and summing the gathers in each group to provide a substack, wherein each group includes at least two migrated shots and wherein a substack is generated from each group, d) applying an amplitude normalization algorithm to the pilot stack so as to generate an amplitude-normalized pilot stack, e) calculating a weight function by comparing each substack to the amplitude-normalized pilot stack, f) weighting each substack using the weight function so as to generate a plurality of weighted substacks, g) summing the overlapping portions of the weighted substacks so as to generate a output stack, and h) using the output stack to generate an image of a subsurface region. In addition, the method may also include the step of using the weight function to construct or update a velocity model.

The step of comparing in step e) may consist of at least one of correlating, subtracting, and adding and step e) may include computing a least squares match filter. By way of example only, the weight function may have a length between 1 and 50,000 data points.

Step f) may include at least one calculation selected from the group of correlation, convolution, multiplication, and combinations thereof. If desired, step f) may further include using an amplitude-based weighting algorithm and/or an illumination-based weighting algorithm.

Step c) may comprise partitioning the migrated shot gathers into, for example, at least 40 groups and may also comprise partitioning the migrated shot gathers depending on their vector distances, their respective quadrants, or their azimuth, image depth and distance. In the latter instance, the migrated shot gathers may be partitioned into muting cones that are expressed as percentages of X=Z, where X is distance and Z is image depth.

The method may also include repeating steps d) through g) at least once, using the output stack as the pilot stack.

BRIEF DESCRIPTION OF THE FIGURES

For a more detailed understanding of the preferred embodiments, reference will be made to the accompanying Figures, in which.

DETAILED DESCRIPTION OF THE PREFERRED EMBODIMENTS

Figure 1:
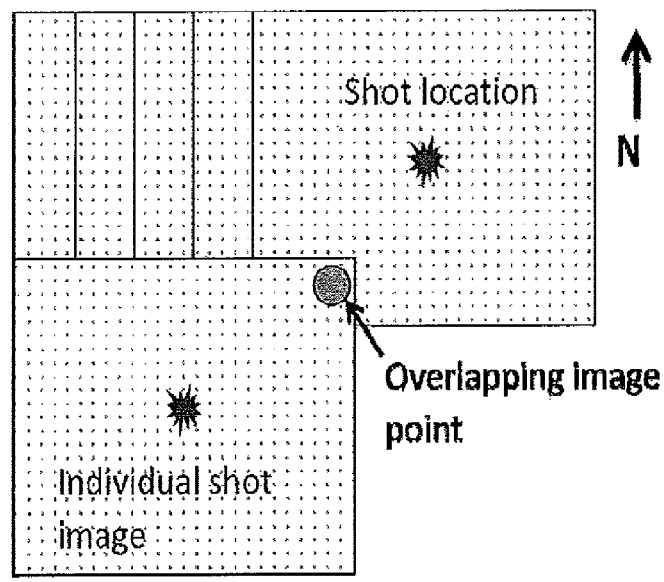
FIG. 1 is a schematic diagram illustrating how images shots can be sorted into overlapping image points prior to stacking and assigned a location according to the horizontal distance from the shot to the image location.
Figure 2:
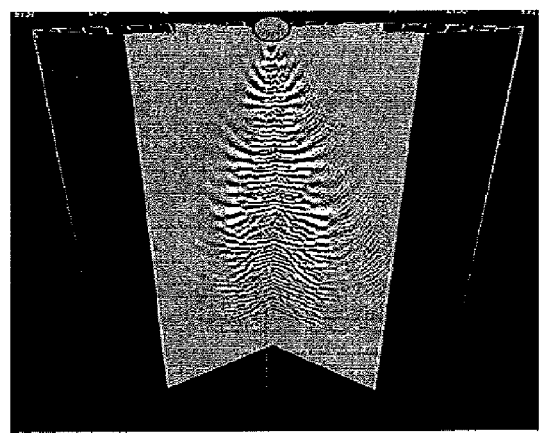
FIG. 2 is an example of a Shot-Image Gather (SIG) that might result from the setup shown in FIG. 1.
Figure 3:
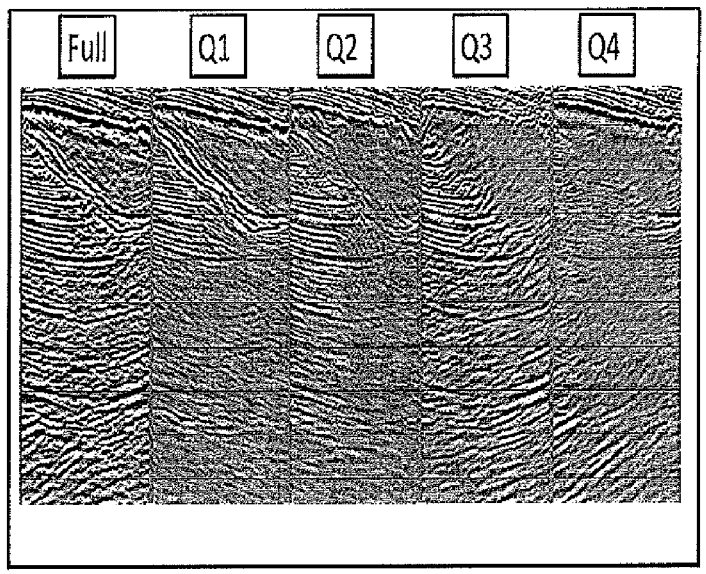
FIG. 3 is an example of a full stack compared to four quadrant stacks partitioned from the full SIG data.

In order to provide a data-dependent mute function, we start with SIG substacks. It can be observed that substacks of shot-image gathers produce an image showing which parts of the subsurface are illuminated by different grouping of shots. One example is to split the SIG into quadrants depending on the vector SIG distance (i.e., NE, SE, NW, SW) as shown in FIG. 3.

The quadrant stacks show how different parts of the image are imaged by different subsets of migrated shots. It is desirable to design a way to weight the different substacks so as to achieve an optimal image. One example of such an approach is to use illumination weights for stacking on post-migration Vector Offset Tile data, as shown by Xu et al., 2011.

The present invention is based on the observation that the noise on any particular SIG can be parsimonious but of very high amplitude. Hence, an amplitude-based weighting of an entire quadrant may not properly reject the noise. This is also the case for illumination-based weighting as there is no assurance that the noise is not also of high amplitude in the areas where the signal is well illuminated.

High amplitude noise is suggestive of a diversity weighting approach for optimal stacking of the substacks. Zero-lag correlation is preferred as a weight on a candidate substack based on how well the substack traces correlate with the full stack (see e.g., Foster and Sengbush, 1968).

A simple and effective tool for doing this is a least squares matching filter using a short filter. This method also allows laterally and vertically varying match filters to compensate for illumination effects and variable amounts of noise in the substacks. Each substack is matched to the full stack and the results are summed together. It should be emphasised that this is not an amplitude preserving process as the signal amplitudes are likely to be changed in the process.

Once the match filters are computed and applied to the substacks, the substacks are themselves stacked, resulting in an improved product over the original pilot stack. This process can be iterated where the pilot stack can be the output from the previous match and stack process.

A key step in this process is to apply an amplitude normalization step, e.g., automatic gain control (AGC), to the pilot stack prior to match filtering. Neglecting this step will result in generally decreasing amplitudes as a function of depth with each iteration.

There are various choices between the match filter window length and width, and AGC length, and the filter length that have to be tested and optimized for different datasets. We have found that a filter length longer than 1 point will result in a spatially smoother result, at the cost of some of the high frequencies compared to using a single point filter. This is valuable for areas with very low signal to noise or where a gross structural interpretation is the desired output.

Figure 4:
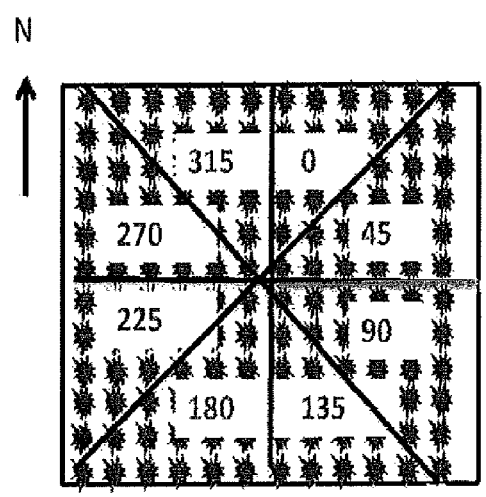
FIG. 4 is a schematic diagram illustrating how data can be partitioned into a series of azimuth pie slices.
Figure 5:
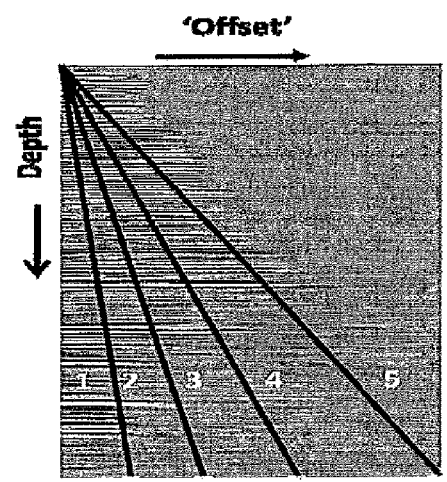
FIG. 5 is a schematic diagram illustrating how data can be partitioned into progressive mute zones.

Diversity is also suggestive of a finer sampling of the substacks than simply quadrant stacking. One approach is to simply cube each SIG into many more equal partitions, for example, cutting each quadrant into 4 gives a total of 16 substacks. Another substacking approach is to partition the SIG into azimuth pie slices ranging from 0 to 360 degrees from the image point, illustrated in FIG. 4, and to apply muting cones that are expressed as percentages of X=Z (e.g., X=0%-20% Z, 20%-40% Z, etc.), as illustrated in FIG. 5. This approach has finer sampling in the shallow regions and wider in the deep which is an expression of the changing angle ranges as a function of depth. Typically the last cone will contain all the remaining data beyond X-Z so that the stack of the substacks will equal the full stack.

We have discovered a pre-stack post-migration signal enhancement method that uses optimal weighting of constituent substacks to obtain the final image. The weighting method can be derived from any number of methods; we find that cross correlation between the substacks and the full stack provides robust results. The method does not provide true amplitude results hence is best suited for structural interpretation.

Figure 6:
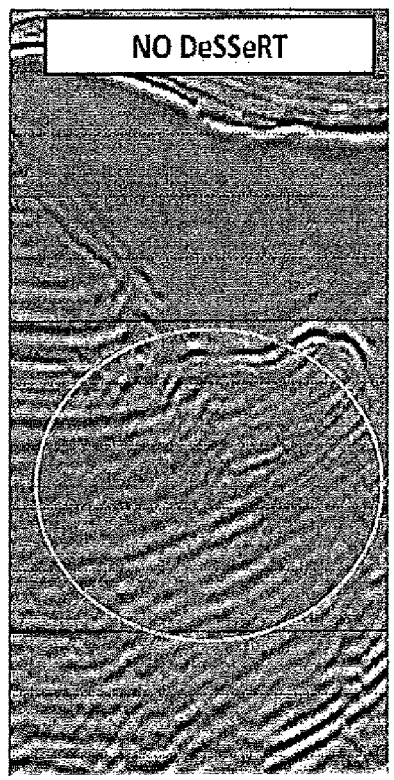
FIGS. 6 and 7 are comparative plots showing a Gulf of Mexico RTM full stack processed according to conventional methods (no DeSSeRT) and a stack of the same data processed according to the present methods (DeSSeRT), respectively.
Figure 7:
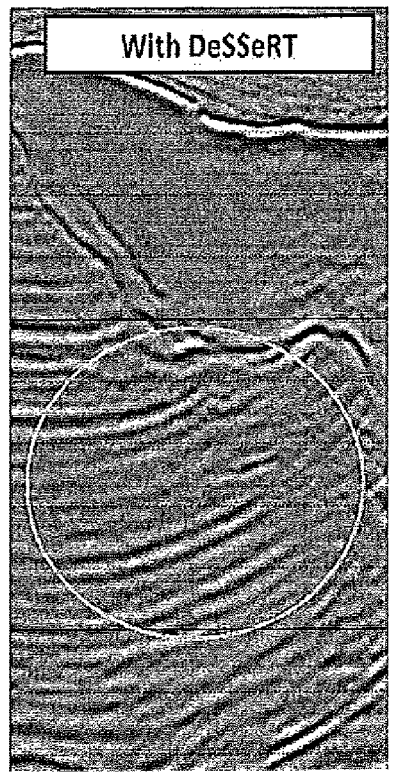

In general, we observe that DeSSeRT will enhance signal in areas with good and poor signal to noise, e.g., subsalt. It is possible that coherent noise can be enhanced if there is no velocity discrimination between signal and noise and/or the velocity is grossly in error. While in practice this is very rare, the results have to be carefully monitored for quality by comparing with conventional stacks. An example of a Gulf of Mexico RTM stack before and after the present DeSSeRT processes is shown in FIGS. 6 and 7.

Compared to conventional post-stack image enhancement methods such as dip filtering, Van-Gogh filtering (Hocker and Fehmers, 2002), or projection error filtering (Soubaras, 1994), we have found that DeSSeRT gives superior quality in terms of overall signal-to-noise improvement while preserving vertical and lateral image resolution.

While the present invention has been described in terms of preferred embodiments, it will be understood that variations and modifications can be made thereto without departing from the scope of the claims. In addition, unless it is logically necessary or explicitly stated, it will be understood that the sequential recitation of steps in the claims is not intended to be a requirement that the steps be performed at any particular time or in any particular order.

REFERENCES

Qing Xu, Yunfeng Li, Xiangkun Yu, Yan Huang, 2011, Reverse Time Migration Using Vector Offset Output to Improve Subsalt Imaging—A Case Study at the Walker Ridge GOM, SEG Annual Meeting.

Foster, M. R., Sengbush, R. L., U.S. Pat. No. 3,622,967. Optimum Stack.

Christian Höcker and Gijs Fehmers
Fast structural interpretation with structure-oriented filtering The Leading Edge, March 2002, v. 21, p. 238-243, de Bruin, C. G. M., Wapenaar, C. P. A., and Berkhout, A. J., 1990, Angle-dependent reflectivity by means of prestack migration: Geophysics, 55, 1223-1234. Mosher, C., and Foster, D., 2000, Common angle imaging conditions for prestack depth migration in 70th Ann. Internat. Mtg. Soc. of Expl. Geophys., 830-833.

Prucha, M., Biondi, B., and Symes, W., 1999, Angle-domain common image gathers by wave-equation migration in 69th Ann. Internat. Mtg. Soc. of Expl. Geophys., 824-827.

Rickett, J. E., and Sava, P. C., 2002, Offset and angle-domain common image-point gathers for shot-profile migration: Geophysics, 67, 883-889.

Sava, P. C., and Fomel, S., 2003, Angle-domain common-image gathers by wavefield continuation methods: Geophysics, 68, 1065-1074.

Soubaras, R., 1994, Signal-preserving random noise attenuation by the F-X projection: 64th Annual Internat. Mtg., Soc. Expl. Geophys., Expanded Abstracts, 1576-1579.

Soubaras, R., 2003, Angle gathers for shot-record migration by local harmonic decomposition in 73rd Ann. Internat. Mtg. Soc. of Expl. Geophys., 889-892.

Xie, X. B., and Wu, R. S., 2002, Extracting angle domain information from migrated wavefield in 72nd Ann. Internat. Mtg, Soc. Expl. Geophys., Expanded Abstracts. Soc. of Expl. Geophys., 1360-1363.

The invention claimed is:

1. A method of processing seismic data so as to provide an image of a subsurface region and to produce hydrocarbons from said subsurface region, comprising the steps of:
   a) providing plurality of migrated shot gathers that contain information about the subsurface region;
   b) summing the overlapping portions of the migrated shot gathers to provide a pilot stack;
   c) partitioning the plurality of migrated shot gathers into a plurality of groups, and summing the gathers in each group to provide a substack, wherein each group includes at least two migrated shots and wherein a substack is generated from each group;
   d) applying an amplitude normalization algorithm to the pilot stack so as to generate an amplitude-normalized pilot stack;
   e) calculating a weight function by comparing each substack to the amplitude-normalized pilot stack;
   f) weighting each substack using the weight function so as to generate a plurality of weighted sub stacks;
   g) summing the overlapping portions of the weighted substacks so as to generate an output stack;
   h) using the output stack to generate an image of said subsurface region; and
   i) producing, from said subsurface region, hydrocarbons that are detected with said image.

2. The method of claim 1 wherein the comparing in step e) consists of at least one of correlating, multiplying, dividing, subtracting, and adding.

3. The method of claim 1, further including the step of using the weight function to construct or update a velocity model.

4. The method of claim 1 wherein step e) includes computing a least squares match filter.

5. The method of claim 1 wherein the weight function has a length between 1 and 50,000 data points.

6. The method of claim 1 wherein step f) comprises at least one calculation selected from the group of correlation, convolution, multiplication, division, and combinations thereof.

7. The method of claim 1 wherein step c) comprises partitioning the migrated shot gathers into at least 40 groups.

8. The method of claim 1 wherein step c) comprises partitioning the migrated shot gathers depending on their vector distances.

9. The method of claim 1 wherein step c) comprises partitioning the migrated shot gathers depending on their respective quadrants.

10. The method of claim 1 wherein step c) comprises partitioning the migrated shot gathers into conical volumes depending on their azimuth, image depth and distance.

11. The method of claim 10 wherein the migrated shot gathers are partitioned into muting cones that are expressed as percentages of X=Z, where X is distance and Z is image depth.

12. The method of claim 1 wherein step f) includes using an amplitude-based weighting algorithm.

13. The method of claim 1 wherein step f) includes using an illumination-based weighting algorithm.

14. The method of claim 1, further including repeating steps d) through g) at least once, using the output stack as the pilot stack.

* * * * *